US010563557B2

(12) United States Patent
Abbassi et al.

(10) Patent No.: US 10,563,557 B2
(45) Date of Patent: Feb. 18, 2020

(54) EXHAUST SYSTEM FOR A WORK VEHICLE

(71) Applicant: CNH Industrial America LLC, New Holland, PA (US)

(72) Inventors: Hesam Abbassi, Chicago, IL (US); Panos Tamamidis, Northbrook, IL (US); Samrendra Kumar Singh, Bolingbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/849,070

(22) Filed: Dec. 20, 2017

(65) Prior Publication Data

US 2019/0186323 A1  Jun. 20, 2019

(51) Int. Cl.
*F01N 3/28* (2006.01)
*F01N 3/20* (2006.01)

(52) U.S. Cl.
CPC ......... *F01N 3/2892* (2013.01); *F01N 3/2066* (2013.01); *F01N 2470/20* (2013.01)

(58) Field of Classification Search
CPC combination set(s) only.
See application file for complete search history.

(56) References Cited

U.S. PATENT DOCUMENTS

| 4,999,998 | A  | 3/1991 | Akerib |
| 6,887,435 | B1 | 5/2005 | Albrecht et al. |
| 6,905,658 | B2 | 6/2005 | Rogers et al. |
| 7,090,810 | B2 | 8/2006 | Sun et al. |

(Continued)

FOREIGN PATENT DOCUMENTS

| CN | 202391522 U | 8/2012 |
| WO | 2014172866 A1 | 10/2014 |

(Continued)

OTHER PUBLICATIONS

Yong Miao, Stuart R Smith; "Urea Mixing Design—Simulation and Test Investigation"; Integrations and Emissions General Motor Company', https://energy.gov/sites/prod/files/2014/03/f8/deer12_miao.pdf.; Jun. 29, 2017.

(Continued)

*Primary Examiner* — Binh Q Tran
(74) *Attorney, Agent, or Firm* — Rickard K. DeMille; Rebecca L. Henkel

(57) ABSTRACT

An exhaust system for a work vehicle includes a selective catalytic reduction (SCR) mixer configured to be disposed within an interior of an SCR housing. The SCR mixer includes an intake conduit configured to receive a flow of an exhaust solution that includes a mixture of exhaust and diesel exhaust fluid. The SCR mixer also includes a J-turn conduit configured to receive the flow of the exhaust solution from the intake conduit, and the J-turn conduit is configured to change a direction of the flow of the exhaust solution. In addition, the SCR mixer includes an exhaust conduit configured to receive the flow of the exhaust solution from the J-turn conduit, and the exhaust conduit includes multiple outlets configured to direct the flow of the exhaust solution out of the SCR mixer to the interior of the SCR housing.

19 Claims, 6 Drawing Sheets

(56) References Cited

U.S. PATENT DOCUMENTS

| | | |
|---|---|---|
| 7,328,572 B2 | 2/2008 | McKinley et al. |
| 7,509,799 B2 | 3/2009 | Amou et al. |
| 7,562,521 B2 | 7/2009 | Shirai et al. |
| 7,793,490 B2 | 9/2010 | Amon et al. |
| 8,033,104 B2 | 10/2011 | Zhang |
| 8,220,253 B2 | 7/2012 | Werni et al. |
| 8,375,703 B2 | 2/2013 | Hayashi et al. |
| 8,460,610 B2 | 6/2013 | Silver et al. |
| 8,479,501 B2 | 7/2013 | McCarthy, Jr. |
| 8,528,320 B2 | 9/2013 | Nagaoka et al. |
| 8,549,844 B2 | 10/2013 | Huethwohl et al. |
| 8,596,044 B2 * | 12/2013 | Werni ............... F01N 3/0335 60/286 |
| 8,745,979 B2 | 6/2014 | Sedlacek et al. |
| 8,756,923 B2 | 6/2014 | Tamamidis |
| 8,899,022 B2 | 12/2014 | Haverkamp et al. |
| 8,915,064 B2 | 12/2014 | Blaisdell et al. |
| 8,959,900 B2 | 2/2015 | Solbrig et al. |
| 8,967,319 B2 | 3/2015 | Novacek et al. |
| 9,132,385 B2 | 9/2015 | Kwan |
| 9,267,413 B2 | 2/2016 | Morey et al. |
| 9,341,100 B2 | 5/2016 | Petry |
| 9,410,464 B2 | 8/2016 | Hicks et al. |
| 9,644,516 B1 * | 5/2017 | Chiruta ............... F01N 3/2066 |
| 2008/0216470 A1 | 9/2008 | Sedlacek et al. |
| 2010/0186382 A1 * | 7/2010 | Schroeder ............... F01N 3/025 60/286 |
| 2011/0146236 A1 | 6/2011 | Sun et al. |
| 2011/0271662 A1 | 11/2011 | Winsor |
| 2013/0247545 A1 * | 9/2013 | Solbrig ............... F01N 3/0253 60/295 |
| 2013/0340417 A1 | 12/2013 | Morey et al. |
| 2015/0059319 A1 | 3/2015 | Shiva et al. |
| 2015/0165378 A1 | 6/2015 | Boeshans et al. |
| 2015/0377111 A1 | 12/2015 | Laurell et al. |
| 2016/0076425 A1 | 3/2016 | Goffe |
| 2016/0194991 A1 * | 7/2016 | Clayton, Jr. ......... F01N 3/0224 422/169 |
| 2017/0114693 A1 | 4/2017 | Stelzer et al. |
| 2017/0120193 A1 * | 5/2017 | Zhang ............... B01F 5/0485 |
| 2017/0138243 A1 | 5/2017 | Zhang |

FOREIGN PATENT DOCUMENTS

| | | |
|---|---|---|
| WO | 2015038897 | 3/2015 |
| WO | 2016107807 A1 | 7/2016 |

OTHER PUBLICATIONS

U.S. Appl. No. 15/849,163, filed Dec. 20, 2017, Hesam Abbassi.

* cited by examiner

EXHAUST SYSTEM FOR A WORK VEHICLE

BACKGROUND

The present disclosure relates generally to work vehicles (e.g., agricultural vehicles) with diesel engines, and more particularly, to an exhaust system configured to reduce emissions from a diesel engine of a work vehicle.

Certain work vehicles (e.g., agricultural vehicles) are powered by diesel engines, which burn diesel fuel and produce exhaust gas. The exhaust gas may include undesirable byproducts such as nitrogen oxides (NOx), carbon monoxide, and particulate material. Certain work vehicles include an exhaust system that reduces the concentration of the undesired byproducts. Traditional exhaust systems may spray a diesel exhaust fluid (DEF) collinearly within the flow of exhaust gas or against a wall of a mixer. Government regulations have reduced the acceptable concentrations of the byproducts within the exhaust gas, particularly in relation to NOx. The traditional exhaust systems may not be able to satisfy new or future regulatory limits. These new regulations urge more efficient methods of regulating exhaust gases while minimizing the packaging size of the exhaust system to reduce the impact on the design of the entire vehicle.

BRIEF DESCRIPTION

In one embodiment, an exhaust system for a work vehicle includes a selective catalytic reduction (SCR) mixer configured to be disposed within an interior of an SCR housing. The SCR mixer includes an intake conduit configured to receive a flow of an exhaust solution that includes a mixture of exhaust and diesel exhaust fluid. The SCR mixer also includes a J-turn conduit configured to receive the flow of the exhaust solution from the intake conduit, and the J-turn conduit is configured to change a direction of the flow of the exhaust solution. In addition, the SCR mixer includes an exhaust conduit configured to receive the flow of the exhaust solution from the J-turn conduit, and the exhaust conduit includes multiple outlets configured to direct the flow of the exhaust solution out of the SCR mixer to the interior of the SCR housing.

In another embodiment, an exhaust system for a work vehicle includes a selective catalytic reduction (SCR) mixer configured to be disposed within an interior of an SCR housing. The SCR mixer includes an inlet configured to receive a flow of an exhaust solution that includes a mixture of exhaust and diesel exhaust fluid. The SCR mixer also includes an intake conduit configured to receive the flow of the exhaust solution from the inlet. Further, the SCR mixer includes multiple J-turn conduits configured to receive the flow of the exhaust solution from the intake conduit, and each of the multiple J-turn conduits is configured to change a direction of the flow of the exhaust solution. In addition, the SCR mixer includes multiple exhaust conduits each configured to receive the flow of the exhaust solution from a respective one of the multiple J-turn conduits. Each of the multiple exhaust conduits includes multiple outlets configured to direct the flow of the exhaust solution out of the SCR mixer to the interior of SCR housing.

In a further embodiment, an exhaust system for a work vehicle includes a selective catalytic reduction (SCR) housing that includes an SCR module configured to be disposed within an interior of the SCR housing and an SCR mixer configured to be disposed within the interior of an SCR housing. The SCR mixer includes an inlet configured to receive a flow of an exhaust solution that includes a mixture of exhaust and diesel exhaust fluid. The SCR mixer also includes an intake conduit configured to receive the flow of the exhaust solution from the inlet. Further, the SCR mixer includes multiple J-turn conduits configured to receive the flow of the exhaust solution from the intake conduit. Each of the plurality of J-turn conduits is configured to change the direction of the flow of the exhaust solution by approximately 180 degrees. In addition, the SCR mixer includes multiple exhaust conduits each configured to receive the flow of the exhaust solution from a respective one of the multiple J-turn conduits. Each of the multiple exhaust conduits include multiple outlets configured to direct the flow of the exhaust solution out of the SCR mixer and substantially parallel to a top surface of the SCR module.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
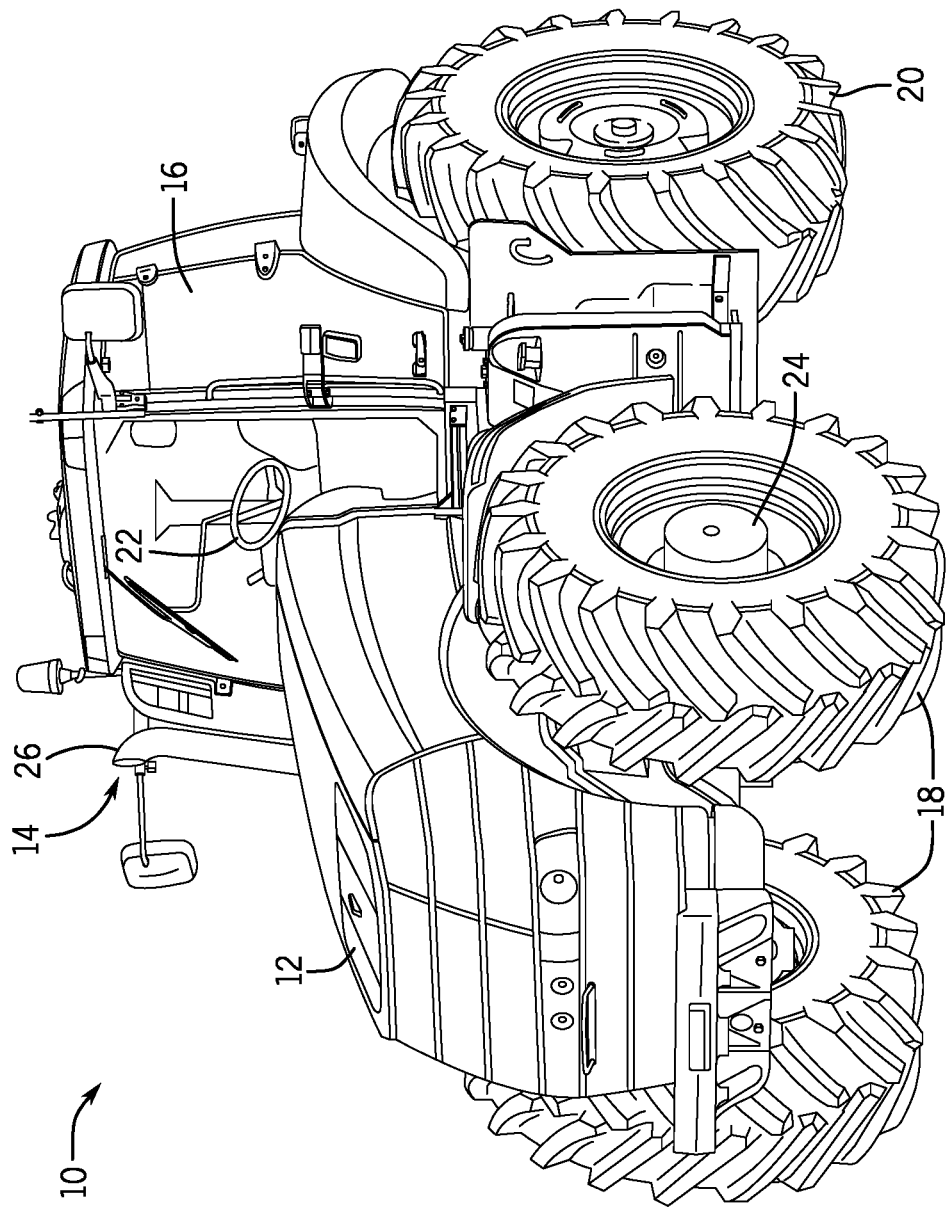
FIG. 1 is a perspective view of an embodiment of a work vehicle which includes an exhaust system for a diesel engine.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include an exhaust system for a diesel engine of a work vehicle (e.g., an agricultural vehicle). As regulations regarding exhaust emissions continue to become more stringent regarding the concentration of expelled byproducts (e.g., nitrogen oxides), manufacturers strive to produce more effective and efficient exhaust systems. Certain exhaust systems are configured to introduce a sprayed fluid (e.g., DEF) into the diesel exhaust. Some exhaust systems spray the DEF collinearly with the flow of exhaust, thereby creating a distribution of the DEF within the exhaust that is at least partially non-uniform. As discussed in detail below, the exhaust system of the present disclosure includes a mixer that mixes diesel exhaust with the DEF. Because the mixer provides a substantially uniform and efficient mixture of DEF and exhaust gas, the mixer may cause the exhaust system to emit lower emissions than that of current exhaust systems. Additionally, the efficient mixing of DEF and exhaust gas enables the exhaust system to use less DEF, thereby reducing the cost to operate the exhaust system. Further, because of the compact design, the mixer may be disposed within a housing of another exhaust system component (e.g., diesel oxidation catalyst housing or selective catalytic reduction housing). Furthermore, in various embodiments of the present disclosure, the exhaust system reduces the amount of backpressure across the exhaust system, thereby increasing the efficiency of the engine. The engine efficiency is increased by directing more of the engine's power to rotational motion rather than siphoning power to force exhaust gas through the exhaust system. By increasing engine efficiency, the engine may provide more power to the work vehicle while consuming less fuel, thereby further decreasing emissions.

FIG. 1 is a perspective view of an embodiment of a work vehicle 10 which includes an exhaust system for a diesel engine. In certain embodiments, the work vehicle 10 may be a tractor, off-road vehicle, agricultural work vehicle, or any other suitable vehicle that may include an exhaust system for a diesel engine. The illustrated work vehicle 10 has a body 12 that may house an engine (e.g., diesel engine), transmission, cooling system, and power train. The body 12 also houses a portion of an exhaust system 14. Further, the work vehicle 10 has a cabin 16 where an operator may sit or stand to operate the work vehicle 10. The work vehicle 10 has two front wheels 18 and two rear wheels 20 that rotate to move the work vehicle 10. In certain embodiments, the work vehicle 10 is maneuvered using a steering wheel 22 that causes the front wheels 18 to turn. As illustrated, the front wheels 18 are coupled to an axle 24 (e.g., fixed or suspended) that supports the front wheels 18, and facilitates wheel rotation. The exhaust system 14 may be routed around various systems within the body 12, such as a cooling system. The exhaust system 14 includes an exhaust pipe 26 which carries the exhaust gas away from the body, and directs the exhaust gas away from the cabin 16.

Figure 2:
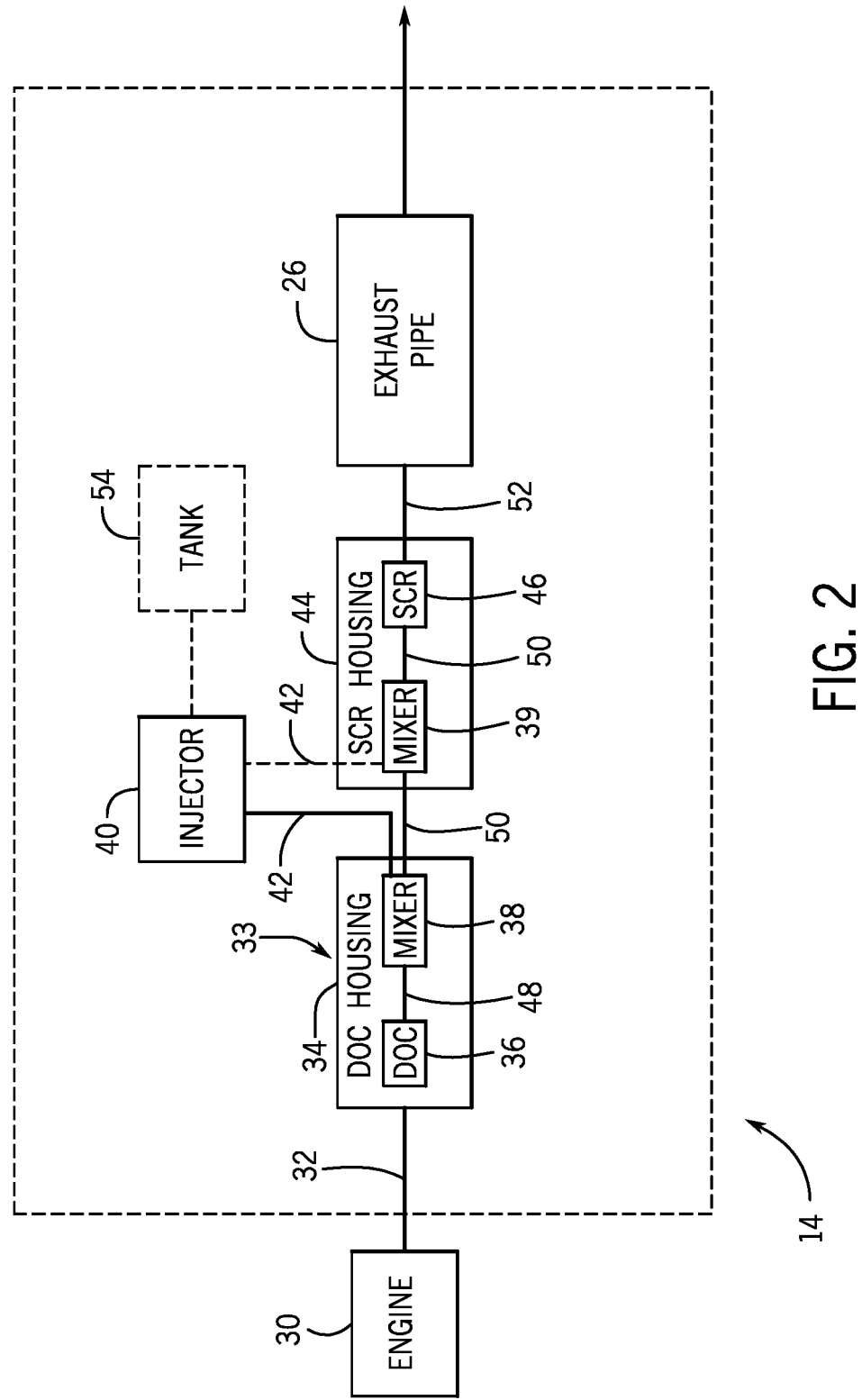
FIG. 2 is a schematic view of an embodiment of an exhaust system that may be employed within the work vehicle of FIG. 1.

FIG. 2 is a schematic view of an embodiment of an exhaust system 14 that may be employed within the work vehicle of FIG. 1. In the illustrated embodiment, an engine 30 expels exhaust gas 32 to the exhaust system 14. In the illustrated embodiment, the exhaust system 14 includes a diesel oxidation catalyst (DOC) assembly 33 having a housing 34 containing a DOC 36 and a DOC mixer 38. The exhaust system 14 also includes an injector 40 for injecting diesel exhaust fluid (DEF) 42 into the mixer 38. The exhaust system 15 also includes a selective catalytic reduction (SCR) housing 44 containing an SCR mixer 39 and an SCR module 46. Certain embodiments of the exhaust system 14 may additionally include a diesel particulate filter to capture particulate matter, a muffler, or any other element suitable for use in an exhaust system.

The DOC housing 34 receives exhaust gas 32, and directs the exhaust gas 32 into the DOC 36. The DOC 36 receives the exhaust and catalyzes the oxidization of carbon monoxide to carbon dioxide by using excess oxygen in the exhaust gas 32. Similarly, the DOC 36 uses excess oxygen to catalyze the conversion of hydrocarbons to water and carbon dioxide. In certain embodiments, the DOC 36 may use ceramics, metals (e.g., platinum, palladium, etc.), or other suitable catalysts to catalyze the oxidization of the hydrocarbons and carbon monoxide molecules. Thus, the DOC 36 receives raw exhaust gas 32 and outputs catalyzed exhaust 48 with reduced concentrations of hydrocarbons and carbon monoxide. The DOC housing 34 directs the exhaust 48 to the DOC mixer 38, which is enclosed within the DOC housing 34. The DOC mixer 38 receives the DEF 42 from the injector 40, in addition to the exhaust 48 from the DOC 36. In certain embodiments, the exhaust system 14 includes a tank for containing the DEF 42, and supplying the DEF to the injector 40. Alternatively, the injector 40 may include a tank 54 containing DEF 42. In further embodiments, the tank 54 containing the DEF 42 may be remote from the injector 40.

The injector 40 sprays the DEF 42 into the exhaust 48 within the DOC mixer 38. The DEF 42 is a solution used to aid in the reduction of NOx from the exhaust 48. For example, in certain embodiments, the DEF 42 may be an aqueous urea solution which undergoes thermal decomposition and hydrolysis within the exhaust system 14 to produce ammonia, which the SCR uses to convert the NOx into nitrogen and water. The DOC mixer 38 provides an initial mixing of the exhaust 48 and the DEF 42. Then, the exhaust and DEF mixture travels to the SCR housing 44 and passes through the SCR mixer 39 that provides additional mixing to the exhaust 48 and DEF 42. Thus, the SCR mixer 39 supplies well-mixed exhaust solution 50 to the SCR module 46. The SCR module 46 receives the exhaust solution 50 and uses the distributed DEF 42 to reduce the NOx concentration in the exhaust gas. Finally, the SCR module 46 outputs processed exhaust 52 with a reduced NOx concentration through the exhaust pipe 26 to be released into the atmosphere.

Figure 3:
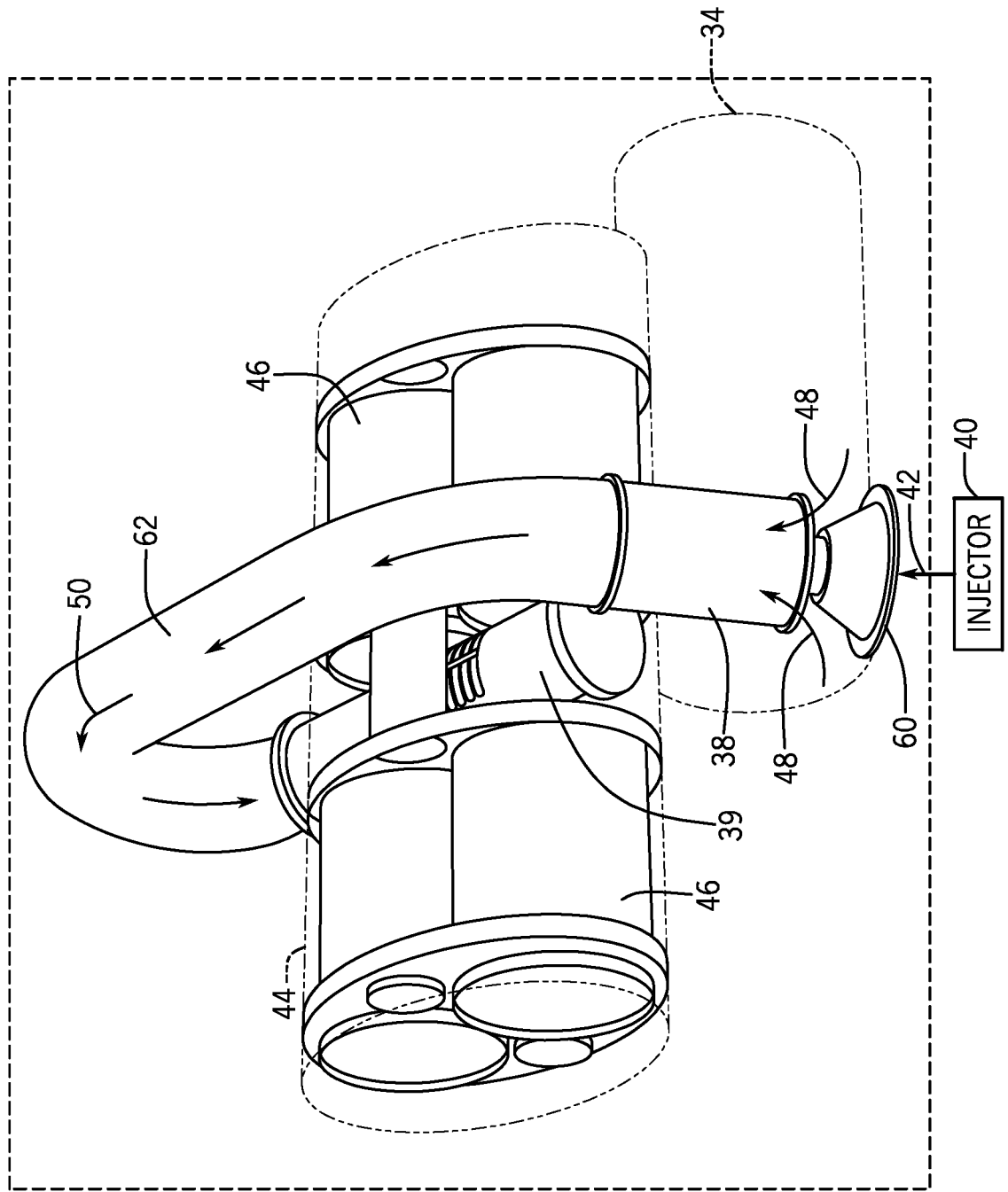
FIG. 3 is a perspective view of an embodiment of a diesel oxidation catalyst assembly and a selective catalytic reduction (SCR) assembly that may be employed within the exhaust system of FIG. 2.

FIG. 3 is a perspective view of an embodiment of a DOC assembly 33 and a SCR assembly that may be used within the exhaust system of FIG. 2. As the exhaust 48 in the DOC housing 34 enters the DOC mixer 38, DEF 42 is sprayed by the injector 40 into the DOC mixer 38 through a DEF nozzle 60. The DEF nozzle 60 causes the DEF 42 to be sprayed as a mist (e.g., droplets, aerosol, etc.) into the DOC mixer 38 to improve the mixing of the DEF 42 and the exhaust 48. Further, the DOC mixer 38 may increase the turbulence of the DEF and exhaust flow to further increase the mixing of the DEF 42 and the exhaust 48 to produce the well-mixed exhaust solution 50. Then, the well-mixed exhaust solution 50 travels through a J-tube 62 before entering the SCR housing 44. The J-tube 62 enables the DEF 42 in the well-mixed exhaust solution 50 to fully evaporate and further mix with the exhaust 48 to further increase the performance of the catalyst within the SCR housing 44.

After entering the SCR housing 44, the well-mixed exhaust solution 50 travels through the SCR mixer 39 before interacting with the SCR module 46. Within the SCR mixer 39, the mixture may pass through holes of various shapes and sizes to further increase the mixing of the DEF 42 and the exhaust 48. Further, the SCR mixer 39 may increase the turbulence of the flow of the well-mixed exhaust solution 50 which may increase the effectiveness of the SCR module 46. After the well-mixed exhaust solution 50 passes through the SCR mixer 39, the well-mixed exhaust solution 50 interacts with the SCR module 46, which decreases the NOx concentration of the well-mixed exhaust solution 50.

Figure 4:
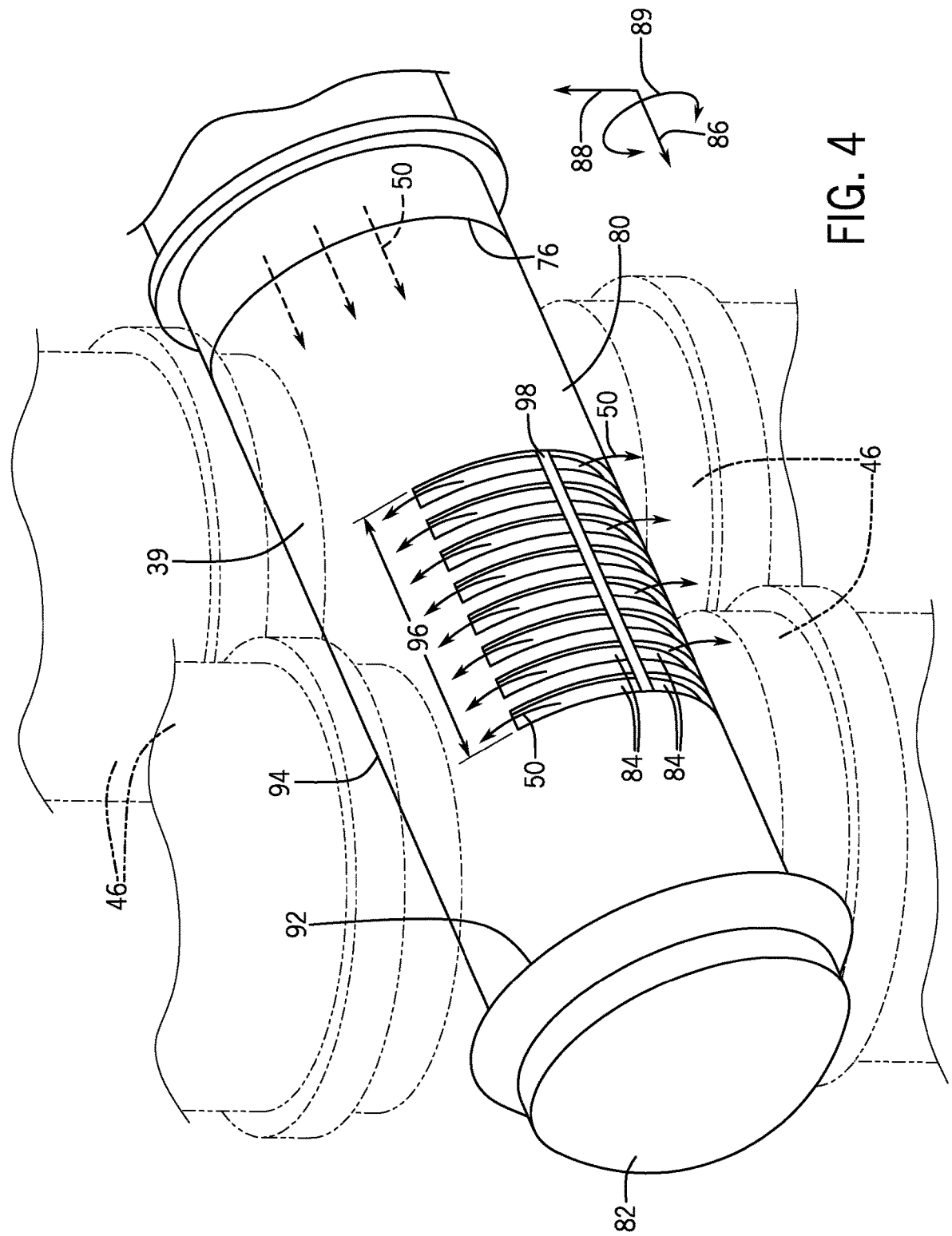
FIG. 4 is a perspective view of an embodiment of an SCR mixer that may be utilized within the SCR assembly of FIG. 3.

FIG. 4 is a perspective view of an embodiment of an SCR mixer 39 that may be utilized within the SCR assembly of FIG. 3. The SCR mixer 39 provides further mixing of the well-mixed exhaust solution 50 and increases the turbulence of the flow of the well-mixed exhaust solution 50. The well-mixed exhaust solution 50 flows from the J-tube 62 and into the SCR mixer 39 at an SCR mixer inlet 76. Then, the well-mixed exhaust solution 50 flows through an SCR mixer body 80 of the SCR mixer 39 in a longitudinal direction 86. Next, the well-mixed exhaust solution 50 flows out of the SCR mixer body 80 through outlets 84. An end cap 82 is included at an opposite longitudinal end 92 of the mixer body 80 from the inlet 76 such that the well-mixed exhaust solution 50 may exit the SCR mixer body 80 through the outlets 84 only.

The SCR mixer 39 is physically coupled to the J-tube 62 at the inlet 76. For example, the SCR mixer 39 may be non-rotatably coupled to the J-tube 62 (e.g., via welds or bolts), or the SCR mixer 39 may be rotatably coupled to the J-tube 62 (e.g., via threads). Further, the SCR mixer 39 has an approximately circular cross-section that remains substantially constant along a length 94 in the longitudinal direction 86. In some embodiments, the cross-section of the SCR mixer 39 may vary along the length 94. For example, the cross-section may change shapes from a circular cross-section to another shape (e.g., an ellipsoid, triangular, a quadrilateral, etc.), or the cross-section may be a constant shape that is non-circular (e.g., an ellipsoid, triangular, a quadrilateral, etc.). In some embodiments, the cross-section of the SCR mixer 39 may maintain substantially the same shape, but the diameter of the approximately circular cross-section may increase or decrease along the length 94. Further, the end cap 82 is physically coupled to the SCR mixer body 80 at the end 92. The end cap 82 may be non-rotatably coupled to the SCR mixer body 80 (e.g., via welds or bolts), or the end cap 82 may be rotatably coupled to the SCR mixer body 80 (e.g., via threads). In some embodiments, the end cap 82 may be integral with the SCR mixer body 80.

In the present embodiment, the outlets 84 are located in a central portion 96 of the SCR mixer body 80. For example, the longitudinal central portion 96 may be approximately centered between the inlet 76 and the end 92 along the longitudinal axis 86, and the central portion 96 may extend along approximately 10 percent, 20 percent, 30 percent, 40 percent, 50 percent, 60 percent, or more of the length 94. In some embodiments, the central portion 96 may not be centered between the inlet 76 and the end 92 along the longitudinal axis 86. For example, the central portion 96 may be closer to the inlet 76 or the end 92. Including the openings in a central portion may increase the time the mixture spends in the SCR mixer body 80, which may enable additional mixing to occur, thereby increasing the effectiveness of the SCR modules 46.

In the present embodiment, the outlets 84 are slots extending about the longitudinal axis 86 along the surface of the SCR mixer body 80. The outlets 84 are arranged such that the well-mixed exhaust solution 50 flowing out of the outlets 84 does not flow directly toward the SCR modules 46, which creates a longer path to the SCR modules 46, which increases mixing, which improves the efficiency of the SCR modules 46. For example, the outlets 84 may direct the well-mixed exhaust solution 50 in a direction substantially parallel (e.g., within 30 degrees, within 25 degrees, within 20 degrees, within 15 degrees, within 10 degrees, within 5 degrees, or less) to the top surface of the SCR modules 46 facing the SCR mixer 39. Accordingly, each outlet 84 extends only partially in a circumferential direction 89, such as 10 degrees, 15 degrees, 20 degrees, 30 degrees, 35 degrees, 45 degrees, or more degrees along the surface of the SCR mixer body 80. In the present embodiment, a strip 98 is included in between the outlets 84 along the circumferential direction 89, and the strip 98 provides additional strength to the SCR mixer body 80. In some embodiments, the strip 98 may be excluded. The outlets 84 may also be directed to sides along the lateral axis 88. Further, the outlets 84 may include any suitable shape, including circles, ellipsoids, triangles, quadrilaterals, etc. In some embodiments, the SCR mixer body 80 may include and suitably number of outlets 84, including 12, 16, 20, 24, 28, 32, 36, 40, 44, 48, etc.

In the present embodiment, the outlets 84 are disposed in two rows, and each row of outlets 84 extends in the longitudinal direction 86. Further, the outlets 84 are disposed as a mirror image on each lateral side of the mixer body 80. In some embodiments, the outlets 84 may be disposed in more or less rows, including 1, 3, 4, 5, 6, or more rows. Further, in some embodiments, the outlets 84 may be not be equally disposed on lateral sides of the mixer body 80. For example, one side may have more or fewer rows of outlets 84, more or fewer outlets 84, and/or one side may include no outlets 84. Further, the outlets 84 of each row are approximately evenly spaced from one another. In some embodiments, the outlets 84 of certain rows may have uneven spacing. Further, in some embodiments, the outlets 84 may be separated into groups of outlets 84. For example, one group of outlets 84 may be closely spaced to one another (e.g., closer to an end 92) and a second group of outlets 84 may be spaced further from one another (e.g., closer to the inlet 76). Utilizing slots for the outlets 84 enables the SCR mixer 39 to include a fewer number of outlets 84 which also provides increased control and predictability over the flow and mixing of the well-mixed exhaust solution 50. Bigger openings, as compared to the slots, reduces speed of the mixture, reduces control of the flow of the mixture, and increases uncertainty in the flow path of the mixture.

Figure 5:
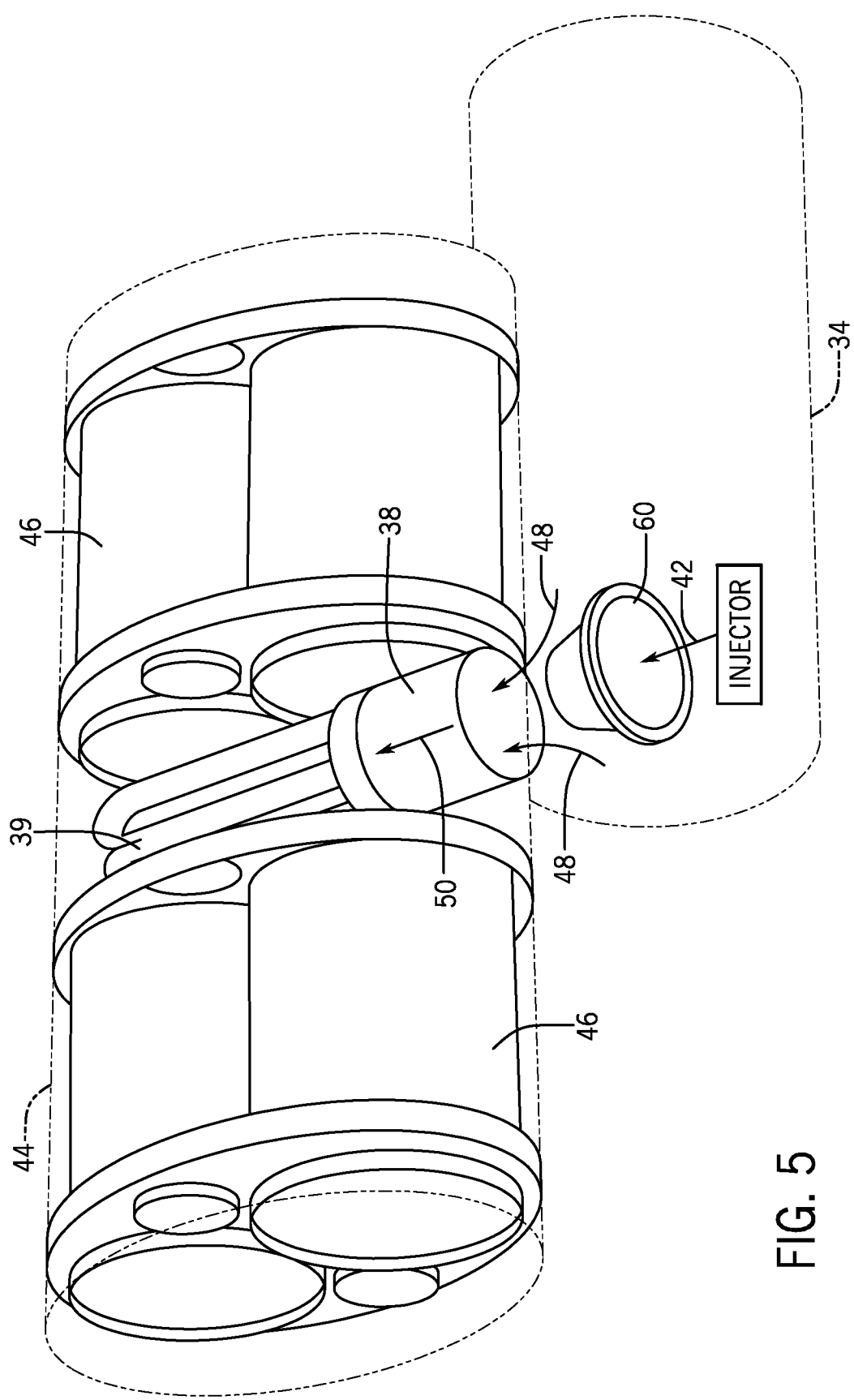
FIG. 5 is a perspective view of an embodiment of a diesel oxidation catalyst assembly and a selective catalytic reduction (SCR) assembly that may be employed within the exhaust system of FIG. 2.

FIG. 5 is a perspective view of an embodiment of a DOC assembly 33 and a SCR assembly that may be used within the exhaust system of FIG. 2. As the exhaust 48 in the DOC housing 34 enters the DOC mixer 38, DEF 42 is sprayed by the injector 40 into the DOC mixer 38 through a DEF nozzle 60. The DEF nozzle 60 causes the DEF 42 to be sprayed as a mist (e.g., droplets, aerosol, etc.) into the DOC mixer 38 to improve the mixing of the DEF 42 and the exhaust 48. Further, the DOC mixer 38 may increase the turbulence of the DEF and exhaust flow to further increase the mixing of the DEF 42 and the exhaust 48 to produce the well-mixed exhaust solution 50.

Then, the well-mixed exhaust solution 50 enters the SCR housing 44. After entering the SCR housing 44, the well-mixed exhaust solution 50 travels through the SCR mixer 39 before interacting with the SCR module 46. In some embodiments, the DOC mixer 38 and the SCR mixer 39 may be coaxial and/or parallel to one another. Within the SCR mixer 39, the mixture may pass through holes of various shapes and sizes to further increase the mixing of the DEF 42 and the exhaust 48. Further, the SCR mixer 39 may increase the turbulence of the flow of the well-mixed exhaust solution 50 which may increase the effectiveness of the SCR module 46. After the well-mixed exhaust solution 50 passes through the SCR mixer 39, the well-mixed exhaust solution 50 interacts with the SCR module 46, which decreases the NOx concentration of the well-mixed exhaust solution 50.

Figure 6:
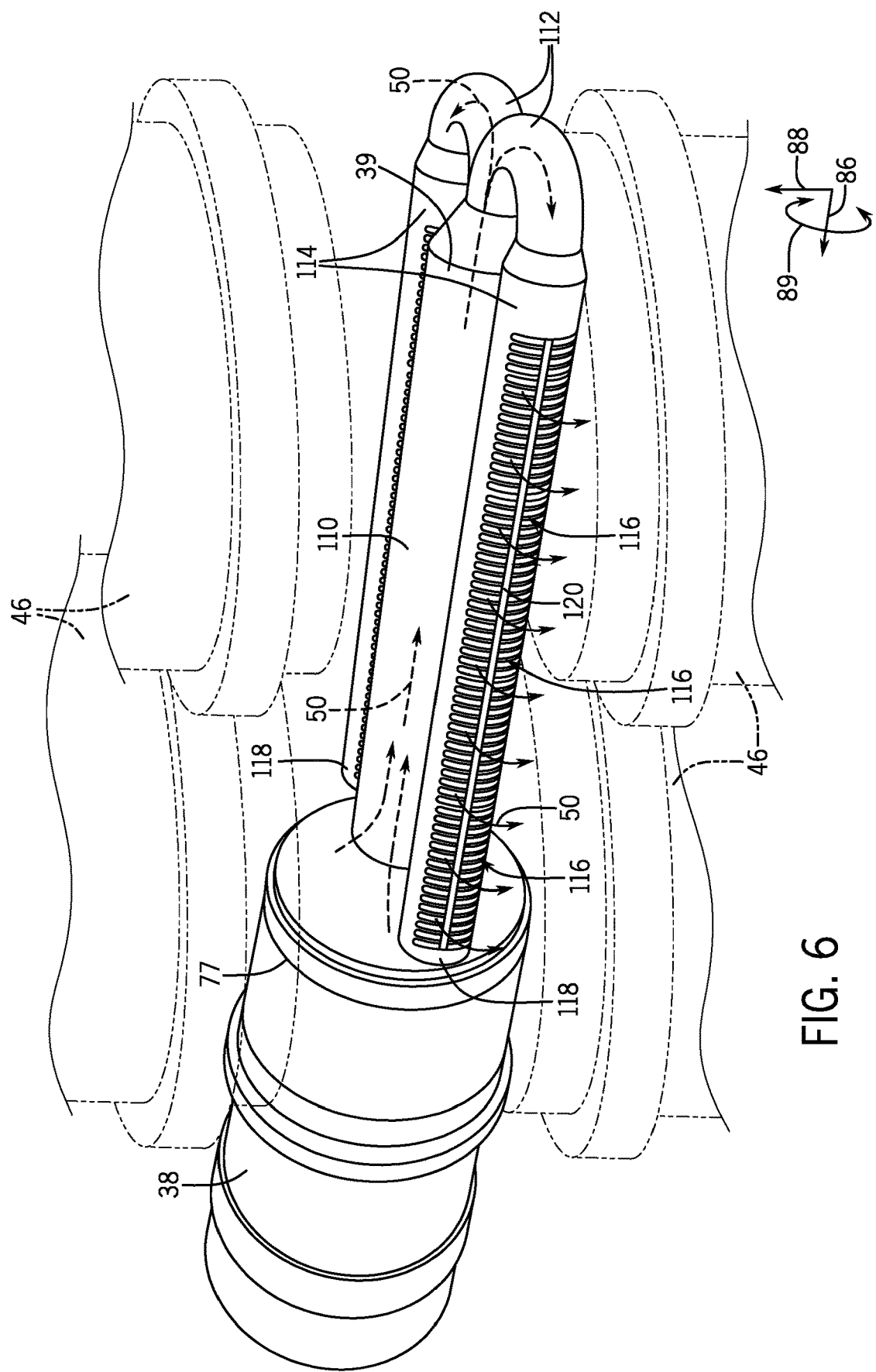
FIG. 6 is a perspective view of an embodiment of an SCR mixer that may be utilized in the SCR assembly of FIG. 5.

FIG. 6 is a perspective view of an embodiment of an SCR mixer 39 that may be utilized within the SCR assembly of FIG. 5. The SCR mixer 39 provides further mixing of the well-mixed exhaust solution 50 and increases the turbulence of the flow of the well-mixed exhaust solution 50. The well-mixed exhaust solution 50 flows from the DOC mixer 38 into the SCR mixer 39 at an SCR mixer inlet 77. Then, the well-mixed exhaust solution 50 flows into a conduit of a closed central portion 110 of the SCR mixer 39 that has a smaller diameter than the SCR mixer inlet 77. For example, the diameter of the closed central portion 110 may be 90 percent, 80 percent, 70 percent, 60 percent, 50 percent, 40 percent, 30 percent, 20 percent, or less than the diameter at the SCR mixer inlet 77. The well-mixed exhaust solution 50 flows through J-turn conduits 112, which have a smaller diameter than the closed central portion 110. For example, the diameter of the J-turn conduits 112 may be 90 percent, 80 percent, 70 percent, 60 percent, 50 percent, 40 percent, 30 percent, 20 percent, or less than the diameter of the closed central portion 110. Next, the well-mixed exhaust solution 50 flows through outlet section conduits 114, and out of the outlet section conduits 114 through outlets 116. Further, the SCR mixer 39 is closed at ends 118 such that the only exit for the well-mixed exhaust solution 50 is through the outlets 116.

The SCR mixer 39 is physically coupled to the DOC mixer 38 at the SCR mixer inlet 77. For example, the SCR mixer 39 may be non-rotatably coupled to the DOC mixer 38 (e.g., via welds or bolts), or the SCR mixer 39 may be rotatably coupled to the DOC mixer 38 (e.g., via threads). Further, each of the closed central portion 110, the J-turn conduits 112, and the outlet section conduits 114 have substantially circular cross-section that remains substantially constant along the longitudinal axis 86. In some embodiments, the cross-section of at least one conduit may vary along the longitudinal axis 86. For example, the cross-section may change shapes from a circular cross-section to another shape (e.g., an ellipsoid, triangular, a quadrilateral, etc.), or the cross-section may be a constant shape that is non-circular (e.g., an ellipsoid, triangular, a quadrilateral, etc.). In some embodiments, the cross-section along one or more of the conduits may maintain substantially the same shape, but the diameter of the cross-section may increase or decrease along the longitudinal axis 86.

The present embodiment includes two J-turn conduits 112 and two corresponding outlet section conduits 114. In some embodiments, the SCR mixer 39 may include more or fewer J-turn conduits 112 and a corresponding number of outlet section conduits 114, such as 1, 3, 4, 5, 6, or more J-turn conduits and outlet section conduits. Further, there may be more J-turn conduits 112 than outlet section conduits 114. For example, more J-turn conduits 112 may be included to increase the length of time the well-mixed exhaust solution 50 spends in the SCR mixer 39 before exiting through the outlets. Further, in some embodiments, the J-turn conduits 112 may turn at an angle other than 180 degrees, such as 120 degrees, 150 degrees, 210 degrees, 240 degrees, or any other suitable angle.

In the present embodiment, the outlets 116 are located along a substantial portion of the longitudinal extent of each outlet section conduit 114. For example, the outlets 116 may be located along approximately 70 percent, 80 percent, 90 percent, or more of the longitudinal extent of the outlet section conduits 114. In the present embodiment, the outlets 116 are slots extending in the circumferential direction 89 along the surface of the outlet section conduits 114. The outlets 116 are arranged such that the well-mixed exhaust solution 50 flowing out of the outlets 116 does not flow directly toward the SCR modules 46. For example, the outlets 116 may direct the well-mixed exhaust solution 50 in a direction substantially parallel (e.g., within 30 degrees, within 25 degrees, within 20 degrees, within 15 degrees, within 10 degrees, within 5 degrees, or less) to the top surface of the SCR modules 46 facing the SCR mixer 39, which increases the mixing time which leads to better mixing, thereby improving the efficiency of the SCR modules 46. In addition, each outlet 116 extends only partially about the longitudinal axis 86 in the circumferential direction 89, such as 10 degrees, 15 degrees, 20 degrees, 30 degrees, 35 degrees, 45 degrees, or more along the surface of each outlet section conduit 114. Further, the outlets 116 are disposed as a mirror image on each lateral side of each outlet section conduit 114. In some embodiments, the outlets 116 may be disposed in more or fewer rows, including 1, 3, 4, 5, 6, or more rows. Further, in some embodiments, the outlets 116 may be not be equally disposed on lateral sides of each outlet section conduit 114. For example, one side may have more or fewer rows of outlets 116, more or fewer outlets 116, and/or one or more sides of the outlet section conduits 114 may include no outlets 116.

In the present embodiment, a strip 120 is included in between rows of the outlets 116, and the strip 120 provides additional strength to the SCR mixer body 80. In some embodiments, the strip 120 may be excluded and the outlets 116 may be arranged in a single row. Further, the outlets 116 may include any suitable shape, including circles, ellipsoids, triangles, quadrilaterals, etc. In the present embodiment, the outlets 116 are arranged in groups, and the outlets within each group are substantially evenly spaced from one another along the longitudinal axis 86. Space between groups along the longitudinal axis 86 may be greater, than space between outlets 116 within the same group. Having some spaces between the groups of outlets 116 improves the strength and stability of each outlet section conduit 114. In some embodiments, the outlets 116 may have uneven longitudinal spacing within each group. In some embodiments, the outlets 116 of one group may be closely spaced along the longitudinal axis (e.g., a group closer to the SCR mixer inlet 77), and the outlets 116 of a second group may be more widely spaced (e.g., closer to the end 118). Because the illustrated SCR mixer 39 includes the closed central portion 110 and the J-turn conduits 112, the J-tube depicted in FIG. 3 may be omitted, thereby decreasing the size and/or weight of the exhaust system without decreasing the NOx reduction of the exhaust system. For example, the closed central portion 110 and the J-turn conduits 112 provide extra time and distance for the DEF and exhaust to mix, thereby enabling the omission of the J-tube. Further, omission of the J-tube may enable the illustrated SCR mixer 39 to be coaxial (e.g., along the longitudinal axis 86) with the DOC mixer.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.)) without materially departing from the novel teachings and advantages of the subject matter recited in the claims. It is, therefore, to be understood that the appended claims are intended to cover all such modifications and changes as fall within the true spirit of the disclosure. Furthermore, in an effort to provide a concise description of the embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An exhaust system for a work vehicle comprising:
a selective catalytic reduction (SCR) mixer configured to be disposed within an interior of an SCR housing, wherein the SCR mixer comprises:
an intake conduit configured to receive a flow of an exhaust solution that includes a mixture of exhaust and diesel exhaust fluid;
a plurality of J-turn conduits configured to receive the flow of the exhaust solution from the intake conduit, wherein each of the plurality of J-turn conduits is configured to change a direction of the flow of the exhaust solution; and
a plurality of exhaust conduits each configured to receive the flow of the exhaust solution from a respective one of the plurality of J-turn conduits, wherein each of the plurality of exhaust conduits comprises a plurality of outlets configured to direct the flow of the exhaust solution out of the SCR mixer to the interior of the SCR housing.

2. The exhaust system of claim 1, wherein the SCR mixer is configured to be coaxial with a second mixer of the exhaust system.

3. The exhaust system of claim 1, wherein the intake conduit, the plurality of J-turn conduits, and the plurality of exhaust conduits are integrally formed with one another.

4. The exhaust system of claim 1, wherein the intake conduit, the plurality of J-turn conduits, and the plurality of exhaust conduits have a substantially circular cross-section.

5. The exhaust system of claim 1, wherein a first cross-sectional area of the intake conduit, a second cross-sectional area of the plurality of J-turn conduits, and a third cross-sectional area of the plurality of exhaust conduits are different from one another.

6. The exhaust system of claim 1, wherein the plurality of outlets are distributed along at least 80 percent of a longitudinal extent of each of the plurality of exhaust conduits.

7. The exhaust system of claim 1, wherein the plurality of outlets are configured to direct the flow of the exhaust solution in a substantially parallel direction with respect to a top surface of an SCR module.

8. The exhaust system of claim 1, wherein each of the plurality of outlets forms a slot that extends at least 10 degrees about a longitudinal axis.

9. The exhaust system of claim 1, wherein each of the plurality of J-turn conduits is configured to change the direction of the flow of the exhaust solution by approximately 180 degrees.

10. An exhaust system for a work vehicle comprising:
a selective catalytic reduction (SCR) mixer configured to be disposed within an interior of an SCR housing, wherein the SCR mixer comprises:
an inlet configured to receive a flow of an exhaust solution that includes a mixture of exhaust and diesel exhaust fluid;
an intake conduit configured to receive the flow of the exhaust solution from the inlet;
a plurality of J-turn conduits configured to receive the flow of the exhaust solution from the intake conduit, wherein each of the plurality of J-turn conduits is configured to change a direction of the flow of the exhaust solution; and
a plurality of exhaust conduits each configured to receive the flow of the exhaust solution from a respective one of the plurality of J-turn conduits, wherein each of the plurality of exhaust conduits comprises a plurality of outlets configured to direct the flow of the exhaust solution out of the SCR mixer to the interior of SCR housing.

11. The exhaust system of claim 10, wherein the SCR mixer is configured to be coaxial with a second mixer of the exhaust system.

12. The exhaust system of claim 10, wherein the inlet, the intake conduit, the plurality of J-turn conduits, and the plurality of exhaust conduits are integrally formed with one another.

13. The exhaust system of claim 10, wherein the plurality of outlets are distributed along at least 80 percent of a longitudinal extent of each of the plurality of exhaust conduits.

14. The exhaust system of claim 10, wherein the plurality of outlets are configured to direct the flow of the exhaust solution in a substantially parallel direction with respect to a top surface of an SCR module.

15. The exhaust system of claim 10, wherein the plurality of exhaust conduits includes two exhaust conduits disposed on opposing lateral sides of the intake conduit, and each of the two exhaust conduits are parallel to one another with respect to a longitudinal axis.

16. The exhaust system of claim 15, wherein each of the plurality of J-turn conduits is configured to change the direction of the flow of the exhaust solution by approximately 180 degrees.

17. An exhaust system for a work vehicle comprising:
a selective catalytic reduction (SCR) housing comprising:
an SCR module configured to be disposed within an interior of the SCR housing; and
an SCR mixer configured to be disposed within the interior of an SCR housing, wherein the SCR mixer comprises:
an inlet configured to receive a flow of an exhaust solution that includes a mixture of exhaust and diesel exhaust fluid;
an intake conduit configured to receive the flow of the exhaust solution from the inlet;
a plurality of J-turn conduits configured to receive the flow of the exhaust solution from the intake conduit, wherein each of the plurality of J-turn conduits is configured to change the direction of the flow of the exhaust solution by approximately 180 degrees; and
a plurality of exhaust conduits each configured to receive the flow of the exhaust solution from a respective one of the plurality of J-turn conduits, wherein each of the plurality of exhaust conduits comprises a plurality of outlets configured to direct the flow of the exhaust solution out of the SCR mixer and substantially parallel to a top surface of the SCR module;

wherein a first cross-sectional area of the inlet, a second cross-sectional area of the intake conduit, a third cross-sectional area of the plurality of J-turn conduits, and a fourth cross-sectional area of the plurality of exhaust conduits have a substantially circular cross-section, and wherein the first cross-sectional area, the second cross-sectional area, the third cross-sectional area, and the fourth cross-sectional area are different from one another.

18. The exhaust system of claim 17, wherein the plurality of outlets are distributed along at least 80 percent of a longitudinal extent of each of the plurality of exhaust conduits.

19. The exhaust system of claim 17, wherein the each of the plurality of outlets comprises a slot that extends at least 10 degrees about a longitudinal axis.

\* \* \* \* \*